(12) United States Patent
Takahashi

(10) Patent No.: US 6,884,389 B2
(45) Date of Patent: Apr. 26, 2005

(54) LEAD-FREE SOLDER ALLOY AND LEAD-FREE SOLDER PASTE USING THE SAME

(75) Inventor: Kuniaki Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/461,500

(22) Filed: Jun. 16, 2003

(65) Prior Publication Data

US 2003/0230361 A1 Dec. 18, 2003

(30) Foreign Application Priority Data

Jun. 17, 2002 (JP) .................................... 2002-175610

(51) Int. Cl.[7] .................... B23K 35/26; C22C 13/02
(52) U.S. Cl. .................... 420/562; 148/400; 148/23; 420/561
(58) Field of Search ............ 148/400, 23; 420/561–562

(56) References Cited

U.S. PATENT DOCUMENTS 6,656,291 B1 * 12/2003 Ueda ........................... 148/24

FOREIGN PATENT DOCUMENTS

JP 2000-141079 5/2000
JP 2002178191 * 6/2002

OTHER PUBLICATIONS

Japanese Patent Office Action, titled "Notification of Reasons for Rejection" (2 pages), mailed Oct. 5, 2004 for a counterpart foreign application, and its English translation (2 pages).

* cited by examiner

*Primary Examiner*—Sikyin Ip
(74) *Attorney, Agent, or Firm*—Finnegan, Henderson, Farabow, Garrett & Dunner, L.L.P.

(57) ABSTRACT

Disclosed is a lead-free solder alloy containing 43 to 47% by weight of bismuth, 0.5 to 2.5% by weight of silver, 0.25 to 0.75% by weight of copper, 0.25 to 0.75% by weight of indium, 0.02 to 0.09% by weight of nickel and the balance of tin.

6 Claims, 2 Drawing Sheets

LEAD-FREE SOLDER ALLOY AND LEAD-FREE SOLDER PASTE USING THE SAME

CROSS-REFERENCE TO RELATED APPLICATIONS

This application is based upon and claims the benefit of priority from the prior Japanese Patent Application No. 2002-175610, filed Jun. 17, 2002, the entire contents of which are incorporated herein by reference.

BACKGROUND OF THE INVENTION

1. Field of the Invention

The present invention relates to a solder alloy used mainly in mounting an electronic part to a printed wiring substrate and a lead-free solder paste using the same.

2. Description of the Related Art

A solder alloy, which is melted at a low temperature and has good electrical connection characteristics, is generally used in mounting an electronic part to a printed wiring substrate.

The solder alloy is required to be excellent in each of the tensile strength, the elongation, the mechanical characteristics such as a thermal fatigue strength, the solder wettability, and the solderability.

The solder alloys include, for example, a tin-lead alloy, a tin-silver alloy, a tin-antimony alloy, and a tin-bismuth alloy. Among these alloys, the tin-lead alloy was widely used as a solder alloy excellent in the characteristics given above.

In recent years, the effects of lead on the human body have come to be considered a serious health problem. Therefore, it is very important to develop a lead-free solder alloy excellent in the characteristics referred to above.

However, a serious problem remains unsolved in the lead-free solder alloy that the melting point of the lead-free solder alloy is generally higher than that of the tin-lead alloy by at least 40° C.

A tin-bismuth binary solder alloy containing 25 to 55% by weight of bismuth and the balance of tin and unavoidable impurities is disclosed in, for example, Jpn. Pat. Appln. KOKAI Publication No. 2000-141079. Among the lead-free solder alloys, the tin-bismuth binary solder alloy has a relatively low melting point. However, it was difficult for the tin-bismuth binary solder alloy to simultaneously satisfy the mechanical characteristics and the wettability, with the result that tin-bismuth binary solder alloy is insufficient for use as a substitute for tin-lead solder alloy.

Under the circumstances, it is very important to develop a lead-free solder having a low melting point, and being capable of sufficiently satisfying the wettability, the solderability, and various mechanical characteristics.

BRIEF SUMMARY OF THE INVENTION

According to one embodiment of the present invention, there can be provided a lead-free solder alloy containing 43 to 47% by weight of bismuth, 0.5 to 2.5% by weight of silver, 0.25 to 0.75% by weight of copper, 0.25 to 0.75% by weight of indium, 0.02 to 0.09% by weight of nickel and the balance of tin.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

The lead-free solder alloy of the present invention is an alloy containing tin and bismuth in larger amount and has a composition given below.

Composition of Lead-free Solder Alloy:

| | |
|---|---|
| Bismuth: | 43 to 47% by weight |
| Silver: | 0.5 to 2.5% by weight |
| Copper: | 0.25 to 0.75% by weight |
| Indium: | 0.25 to 0.75% by weight |
| Nickel: | 0.02 to 0.09% by weight |
| Tin: | Balance |

It is possible for the balance to include unavoidable impurities.

According to one embodiment of the present invention, it is possible to obtain a solder alloy having a low melting point and satisfactory in each of the tensile strength, the elongation, the mechanical characteristics such as the thermal fatigue life, and the solder wettability, by adding subsidiary components consisting of certain amounts of silver, copper, indium and nickel to a binary based alloy containing tin and bismuth as main components.

As a result of extensive research on a binary based alloy containing tin and bismuth as main components, it has been found that the composition given above is effective for obtaining a solder alloy satisfying simultaneously both excellent mechanical properties and excellent solder wettability.

The mechanical properties and the solder wettability of a solder alloy are improved by using a binary alloy having a relatively low melting point and containing tin and bismuth as main components.

The alloy contains 43 to 47% by weight of bismuth, in some embodiments, 44.5 to 45.5% by weight of bismuth. If the bismuth content of the alloy exceeds 47% by weight, the elongation, i.e., one of the mechanical characteristics, is lowered. On the other hand, if the bismuth content of the alloy is lower than 43% by weight, the liquid phase point of the alloy is elevated so as to rise the melting temperature.

The alloy contains preferably 55 to 50% by weight of tin, and in some embodiments, 53 to 51% by weight of tin. If the tin content of the alloy exceeds 55% by weight, the melting temperature of the alloy tends to be elevated. On the other hand, if the tin content of the alloy is lower than 50% by weight, the elongation tends to be rendered poor.

If silver is added to the tin-bismuth alloy, the resultant alloy exhibits an improved wettability. The influence of silver on the mechanical fatigue life of the tin-bismuth alloy has been examined in order to look into the mechanical characteristics of a tin-bismuth alloy having silver added thereto. It has been found that it is effective to add silver to the alloy of the present invention in an amount not larger than 2.5% by weight.

If the silver addition amount exceeds 2.5% by weight, the mechanical fatigue life of the alloy is lowered. On the other hand, if the silver addition amount is smaller than 0.5% by weight, it is impossible to obtain the effect of improving the wettability of the alloy.

Figure 1:
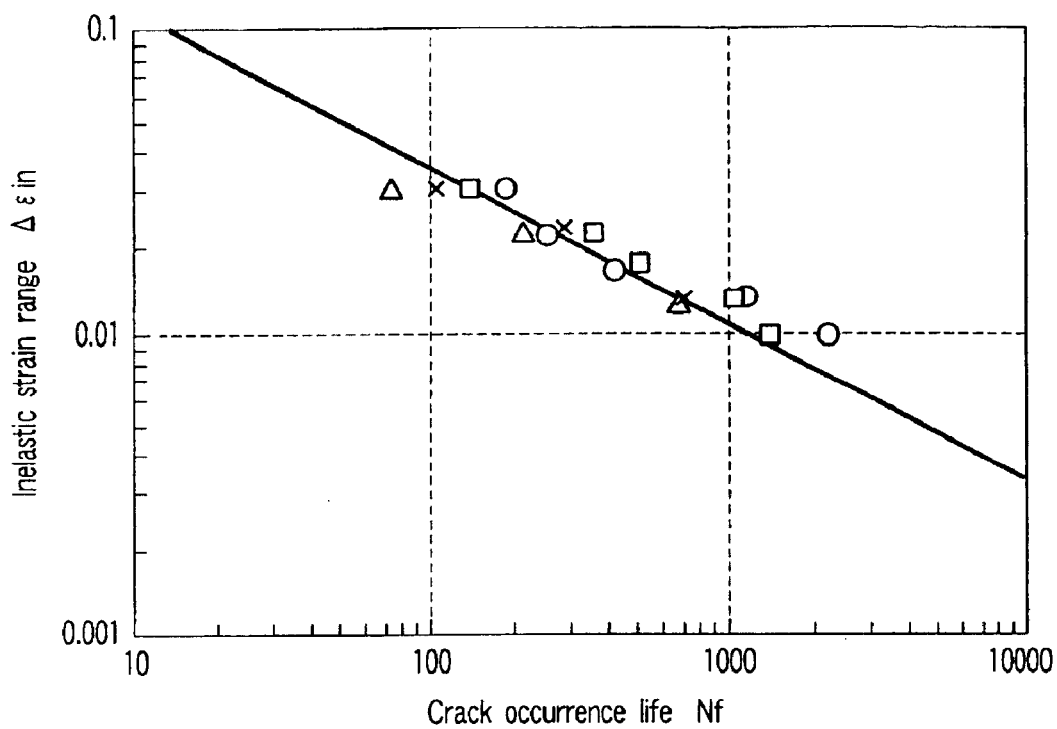
FIG. 1 is a graph exemplifying the influence of silver in respect of the mechanical fatigue life of a tin-bismuth alloy.

FIG. 1 is a graph exemplifying the influence of silver in respect of the mechanical fatigue life of the tin-bismuth alloy.

Used in the test for obtaining the experimental data given in the graph of FIG. 1 were a tin-37% by weight lead alloy, a tin-58% by weight bismuth alloy, a tin-57% by weight bismuth-1% by weight silver alloy, a tin-57% by weight bismuth-2% by weight silver alloy, and a tin-57% by weight bismuth-2.5% by weight silver alloy. Each of these alloys was subjected to a twisting test as a fatigue test of the alloy within a given inelastic strain range so as to measure the time required for the crack occurrence, that is one of a mechanical fatigue life. FIG. 1 shows the experimental data thus obtained. In the graph of FIG. 1, the logarithm of each of the inelastic strain ranges ($\Delta\epsilon_{in}$) is plotted on the ordinate, and the logarithm of the crack occurrence time (Nf) is plotted on the abscissa.

Figure 2:
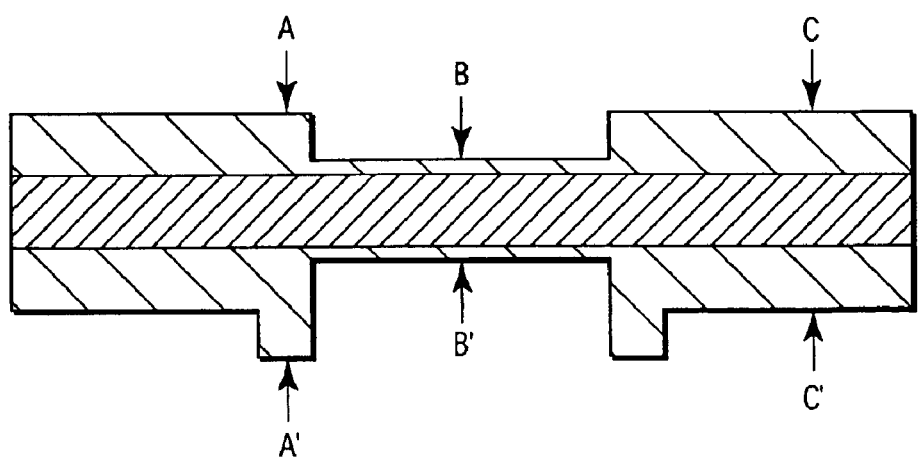
FIG. 2 is a cross sectional view showing a thin circular test piece used in a twisting test.

The twisting test was conducted by using a fatigue tester, in which the alloy sample was cast into a thin circular test piece having a thickness A–A' of 26 mm, a thickness B–B' of 14 mm, a thickness C–C' of 22 mm, and a diameter of 80 mm as shown in FIG. 2, let to stand for at least one month for stabilizing the texture and, then, driven by a stepping motor.

The inelastic strain range corresponds to the width of the shearing stress-shearing strain hysteresis loop obtained from the twisting angle of the test piece and the output of a torque converter in the fatigue test of the solder alloy.

Concerning the fatigue life of the test piece, the number of cycles at the time when the shearing stress is lowered from the initial maximum value by 25% load is defined as the fatigue life.

In the graph of FIG. 1, a straight line 101 represents the experimental data for the tin-37% by weight lead alloy, the mark "○" represents the experimental data for a tin-58% by weight bismuth alloy, the mark "□" represents the experimental data for a tin-57% by weight bismuth-1% by weight silver alloy, the mark "Δ" represents the experimental data for a tin-57% by weight bismuth-2% by weight silver alloy, and the mark "x" represents the experimental data for a tin-57% by weight bismuth-2.5% by weight silver alloy.

As shown in the graph of FIG. 1, the crack occurrence life is lowered with increase in the inelastic strain range. It has been found that the decrease in the crack occurrence life tends to be promoted with increase in the addition amount of silver.

The copper content of the alloy should fall within a range of between 0.25 and 0.75% by weight, in some embodiments, between 0.4 and 0.6% by weight. If the copper content exceeds 0.75%, the mechanical elongation of the alloy is lowered. On the other hand, if the copper content of the alloy is lower than 0.25% by weight, the melting temperature of the alloy is elevated.

The indium content of the alloy should fall within a range of between 0.25 and 0.75% by weight, in some embodiments, between 0.4 and 0.6% by weight. If the indium content exceeds 0.75%, the manufacturing cost of the alloy is markedly increased. On the other hand, if the indium content of the alloy is lower than 0.25% by weight, the melting temperature of the alloy is elevated and the elongation is lowered.

Further, the nickel content of the alloy should fall within a range of between 0.02 and 0.09% by weight, in some embodiments, between 0.05 and 0.09% by weight. If the nickel content exceeds 0.09%, the wettability in the soldering step is deteriorated. On the other hand, if the nickel content of the alloy is lower than 0.02% by weight, the wettability of the alloy in the soldering step is deteriorated.

Figure 3:
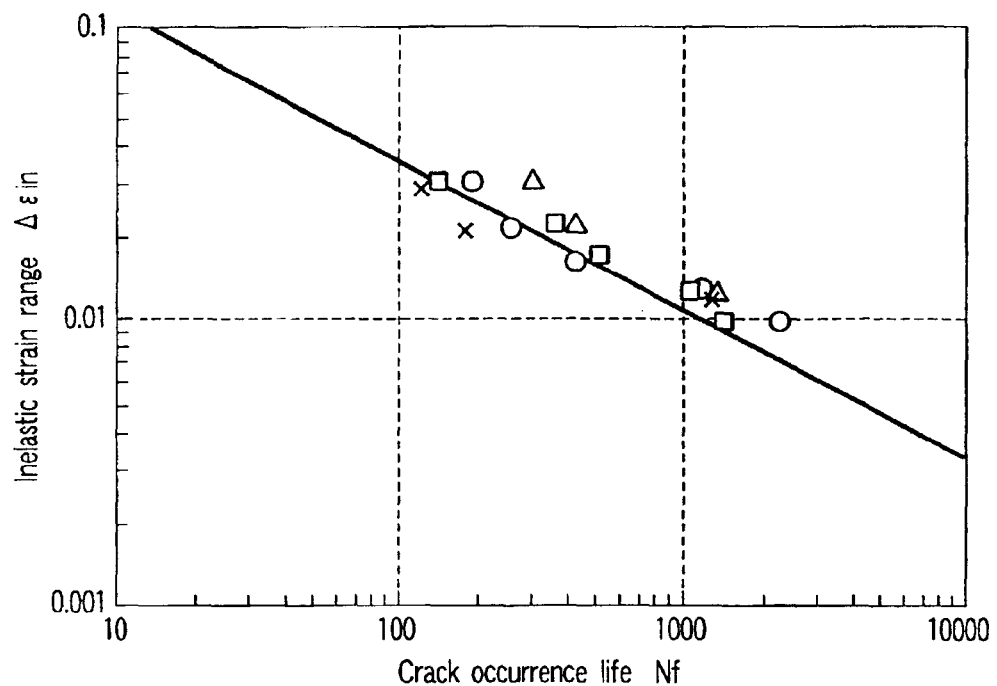
FIG. 3 is a graph exemplifying the influence of other trace elements in respect of the mechanical fatigue life of a tin-bismuth alloy containing traces of silver.
Figure 4:
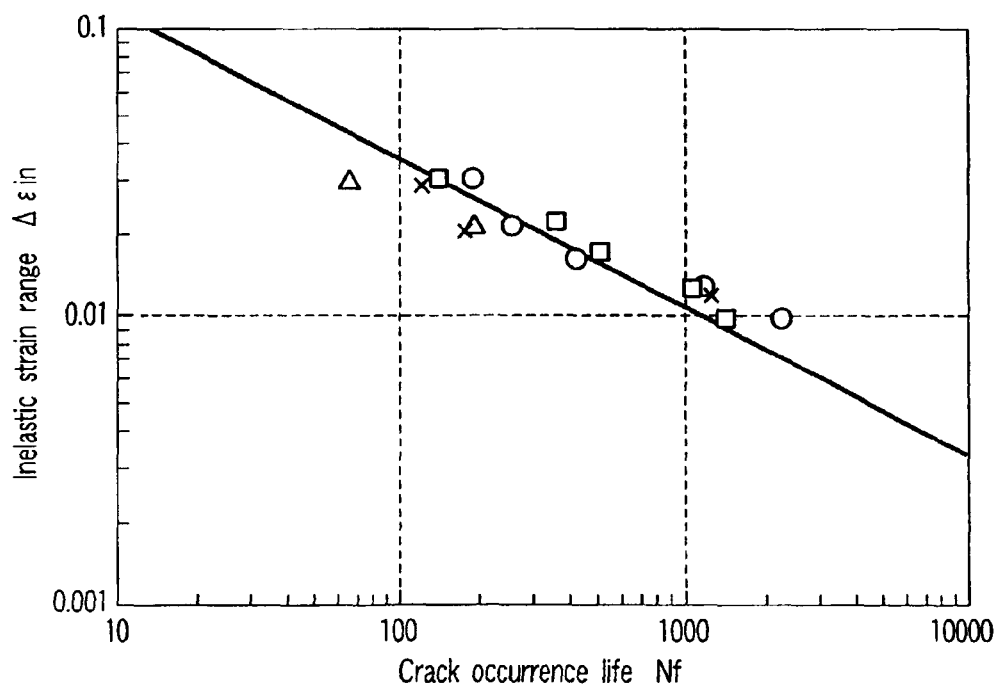
FIG. 4 is a graph exemplifying the influence of other trace elements in respect of the mechanical fatigue life of a tin-bismuth alloy containing traces of silver.

FIGS. 3 and 4 are graphs each exemplifying the influence of other trace elements on the mechanical fatigue life of the tin-bismuth alloy containing traces of silver.

In each of FIGS. 3 and 4, the straight line 101 represents the experimental data for the tin-37% by weight lead alloy. Also, in the graph of FIG. 3, the mark "○" represents the experimental data for a tin-58% by weight bismuth alloy, the mark "□" represents the experimental data for a tin-57% by weight bismuth-1% by weight silver alloy, the mark "Δ" represents the experimental data for a tin-57% by weight bismuth-1% by weight silver-0.5% by weight antimony alloy, and the mark "x" represents the experimental data for a tin-57% by weight bismuth-1% by weight silver-0.5% by weight antimony-0.5% by weight copper alloy.

On the other hand, in the graph of FIG. 4, the mark "○" represents the experimental data for a tin-58% by weight bismuth alloy, the mark "□" represents the experimental data for a tin-57% by weight bismuth-1% by weight silver alloy, the mark "Δ" represents the experimental data for a tin-57% by weight bismuth-1% by weight silver-0.5% by weight copper-0.07% by weight nickel alloy, and the mark "x" represents the experimental data for a tin-57% by weight bismuth-1% by weight silver-0.5% by weight antimony-0.5% by weight copper alloy.

Incidentally, each of FIGS. 3 and 4 is equal to FIG. 1 in the measuring method, the test method, and the items plotted on the ordinate and the abscissa of the graph.

As shown in FIGS. 3 and 4, the crack occurrence life is shortened with increase in the inelastic strain range.

It can be seen, from the graph of FIG. 3 that, if antimony is added to the alloy, the shortening of the crack occurrence life tends to be moderated. However, it has also been found that, if copper is further added, the shortening of the crack occurrence life tends to be promoted.

Also, it has been found from the graph of FIG. 4 that, if both copper and nickel are added to the alloy, the shortening of the crack occurrence life tends to be promoted.

Each of silver, copper and nickel is a traces of component capable of improving the wettability. However, if these traces of components are added in excessively large amounts, the mechanical fatigue life of the alloy tends to be shortened and, thus, the amounts of these trace components are controlled to fall within the ranges specified in some embodiment of the present invention.

In some embodiments, it is possible to add antimony and germanium as subsidiary components to the solder alloy. These subsidiary components are preferably added in an amount not larger than 5% by weight.

If antimony is added to the alloy, it is possible to lower the melting point of the alloy and to improve the mechanical fatigue life of the alloy. Also, if germanium is added to the alloy, the solderability of the alloy in the soldering step tends to be improved.

It should be noted that a lead-free solder paste can be obtained if a flux is mixed with the lead-free solder alloy of the present invention.

In some embodiments, it is possible to mix the flux in an amount falling within a range of, for example, between 7 parts by weight and 20 parts by weight relative to 100 parts by weight of the solder metal.

It is possible to use as a flux a mixture containing, for example, an amine halogen salt or an organic acid, a polyhydric alcohol, and a high molecular weight material.

The amine halogen salts used in some embodiment of the present invention include, for example, acryl amine hydrochloride, aniline hydrochloride, diethyl amine hydrochloride, cyclohexyl amine hydrochloride, monomethyl amine hydrochloride, dimethyl amine hydrochloride, triethyl amine hydrochloride, phenyl hydrazine hydrochloride, n-butyl amine hydrochloride, o-methyl hydrazine hydrochloride, ethyl amine hydrobromide, cyclohexyl hydrobromide, 2-amino ethyl bromide hydrobromide, and tri-n-butyl amine hydrobromide.

The organic acids used in some embodiment of the present invention include, for example, oxalic acid, malonic acid, succinic acid, glutaric acid, adipic acid, pimelic acid, suberic acid, azelaic acid, sebacic acid, maleic acid, tartaric acid, benzoic acid, acetic acid, hydroxy acetic acid, propionic acid, butylic acid, parelic acid, caproic acid, enanthic acid, capric acid, lauric acid, myristic acid, palmitic acid, and stearic acid.

The amine halogen salts and the organic acids enumerated above are used as active agents.

Also, the base materials used in the flux include, for example, abietic acid, dehydro abietate, and α-terpineol.

The thickening agent used in the flux includes, for example, a cured castor oil.

The solvent used in the flux includes, for example, 2-methyl-2,4-pentadiol.

The flux used for preparation of the solder paste some embodiment of the present invention contains, for example, 15 to 50% by weight of the base material, 1 to 10% by weight of the active agent, 3 to 8% by weight of the thickening agent, and 35 to 45% by weight of the solvent.

Further, the solder paste of the present invention contains, for example, 89±0.5% by weight of the lead-free solder alloy and 11.0±0.5% by weight of the flux component.

EXAMPLES

Examples 1 and 2

Prepared were alloys of the compositions shown in Table 1 so as to examine the melting characteristics of the alloys. Table 1 also shows the melting characteristics thus obtained. In Table 1, the numeral put to the element of the alloy composition represents "% by weight", and the element that is not accompanied with a numeral represents the balance.

The wettability and the mechanical characteristics of these alloys were examined. The good results were obtained in each of the wettability and the mechanical characteristics.

Comparative Examples 1 to 14

Prepared were alloys of the compositions shown in Table 1 so as to examine the melting characteristics of the alloys. Table 1 shows the melting characteristics thus obtained.

The solder wettability and the mechanical characteristics of the alloys were also examined. The solder alloys for these Comparative Examples were found to be inferior to the solder alloys of Examples 1 and 2 in each of the mechanical characteristics and the solder wettability.

TABLE 1

|  | Composition | Solid phase point (° C.) | Liquid phase point (° C.) |
|---|---|---|---|
| Comparative Example 1 | Sn—45Bi—1Ag—0.5In | 136.9 | 169.8 |
| Comparative Example 2 | Sn—45Bi—1Ag—0.5In—0.5Cu | 135.8 | 168.1 |
| Comparative Example 3 | Sn—45Bi | 138.5 | 178.4 |
| Comparative Example 4 | Sn—45Bi—1Ag | 138.1 | 171.5 |
| Example 1 | Sn—45Bi—1Ag—0.5Cu—0.5In—0.07Ni | 136.0 | 165.4 |
| Comparative Example 5 | Sn—45Bi—1Ag—0.07Al | 137.5 | 167.2 |
| Comparative Example 6 | Sn—45Bi—2Ag—0.5In—0.5Cu | 136.6 | 162.4 |
| Example 2 | Sn—45Bi—2Ag—0.5Cu—0.5In—0.07Ni | 137.2 | 161.4 |
| Comparative Example 7 | Sn—45Bi—2Ag | 138.0 | 164.6 |
| Comparative Example 8 | Sn—45Bi—2Ag—0.5In | 137.2 | 165.2 |
| Comparative Example 9 | Sn—45Bi—2Ag—0.07Al | 138.7 | 166.3 |
| Comparative Example 10 | Sn—35Bi—1Ag | 138.7 | 183.1 |
| Comparative Example 11 | Sn—35Bi—2Ag | 137.9 | 184.0 |
| Comparative Example 12 | Sn—35Bi | 139.8 | 192.6 |
| Comparative Example 13 | Sn—35Bi—1Ag—0.5In | 136.3 | 183.2 |
| Comparative Example 14 | Sn—35Bi—2Ag—0.5In | 136.5 | 182.3 |

As shown in Table 1, it has been found that the lead-free solder alloy in each of Examples 1 and 2 is low in the liquid phase point and is small in the difference between the liquid phase point and the solid phase point so as to render satisfactory the solderability of the lead-free solder alloy. Also, the lead-free solder alloy for each of Examples 1 and 2 was found to be satisfactory in each of the wettability and the mechanical characteristics.

The solder alloy of Example 1 having a low silver content was low in the liquid phase point and small in the difference between the liquid phase point and the solid phase point, compared with the solder alloy of Example 2, with the result that the solder alloy for Example 1 was found to be prominently satisfactory in the solderability. On the other hand, the solder alloy of Example 2 whose silver content is higher than that of the solder alloy of Example 1 was slightly high in the liquid phase point and is slightly large in the difference between the liquid phase point and the solid phase point. However, the mechanical characteristics such as the tensile strength and the elongation were rendered satisfactory by slightly increasing the silver content.

As described above, the lead-free solder alloys for Examples 1 and 2 were found to be capable of achieving a connection of a high reliability.

On the other hand, the solder alloys of Comparative Examples 1 to 5 and 9 to 14 were found to be incapable of achieving a solder bonding of a low melting point because these solder alloys had an excessively high solid phase point. Also, the solder alloy of each of Comparative Examples 6 to 8, which was relatively low in the solid phase point and was small in the difference between the solid phase point and the liquid phase point, was found to be unsatisfactory in the wettability and the mechanical characteristics.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lead-free solder alloy containing 43 to 47% by weight of bismuth, 0.5 to 2.5% by weight of silver, 0.25 to 0.75% by weight of copper, 0.25 to 0.75% by weight of indium, 0.02 to 0.09% by weight of nickel and the balance of tin.

2. A lead-free solder alloy according to claim 1, wherein the bismuth content falls within a range of between 44.5% by weight and 45.5% by weight, the silver content falls within a range of between 0.9% by weight and 2.2% by weight, the copper content falls within a range of between 0.4% by weight and 0.6% by weight, the indium content falls within a range of between 0.4% by weight and 0.6% by weight, and the nickel content falls within a range of between 0.05% by weight and 0.09% by weight.

3. A lead-free solder alloy according to claim 1, further containing antimony in an amount not larger than 0.5% by weight and germanium in an amount not larger than 0.5% by weight.

4. A lead-free solder paste comprising a lead-free solder alloy containing 43 to 47% by weight of bismuth, 0.5 to 2.5% by weight of silver, 0.25 to 0.75% by weight of copper, 0.25 to 0.75% by weight of indium, 0.02 to 0.09% by weight of nickel and the balance of tin, and a flux.

5. A lead-free solder paste according to claim 4, wherein the bismuth content of the lead-free solder alloy falls within a range of between 44.5% by weight and 45.5% by weight, the silver content of the lead-free solder alloy falls within a range of between 0.9% by weight and 2.2% by weight, the copper content of the lead-free solder alloy falls within a range of between 0.4% by weight and 0.6% by weight, the indium content of the lead-free solder alloy falls within a range of between 0.4% by weight and 0.6% by weight, and the nickel content of the lead-free solder alloy falls within a range of between 0.05% by weight and 0.09% by weight.

6. A lead-free solder paste according to claim 5, further containing antimony in an amount not larger than 0.5% by weight and germanium in an amount not larger than 0.5% by weight.

* * * * *